US011625730B2

United States Patent
Liu et al.

(10) Patent No.: US 11,625,730 B2
(45) Date of Patent: Apr. 11, 2023

(54) SYNTHETIC ONLINE ENTITY DETECTION

(71) Applicant: Equifax Inc., Atlanta, GA (US)

(72) Inventors: Rong Liu, Alpharetta, GA (US); Nian Yan, Alpharetta, GA (US); John D. Ray, Jr., Cumming, GA (US); Sriram Tirunellayi, Duluth, GA (US)

(73) Assignee: EQUIFAX INC., Atlanta, GA (US)

(*) Notice: Subject to any disclaimer, the term of this patent is extended or adjusted under 35 U.S.C. 154(b) by 717 days.

(21) Appl. No.: 16/199,349

(22) Filed: Nov. 26, 2018

(65) Prior Publication Data
US 2019/0164173 A1    May 30, 2019

Related U.S. Application Data

(60) Provisional application No. 62/591,346, filed on Nov. 28, 2017.

(51) Int. Cl.
*G06Q 30/00*   (2012.01)
*G06N 20/00*   (2019.01)
(Continued)

(52) U.S. Cl.
CPC ......... *G06Q 30/0185* (2013.01); *G06N 20/00* (2019.01); *H04W 12/122* (2021.01)

(58) Field of Classification Search
USPC ...... 705/1.1, 38, 44, 318; 706/52, 12; 726/6, 726/26; 707/694
See application file for complete search history.

(56) References Cited

U.S. PATENT DOCUMENTS

2006/0212487 A1* 9/2006 Kennis ............... G06Q 10/10
   705/38
2010/0161526 A1* 6/2010 Zhang ................ G06N 5/025
   706/12
(Continued)

FOREIGN PATENT DOCUMENTS

WO    WO-2015002630 A2 *  1/2015  ............. G06Q 10/10
WO    WO-2016154419 A1 *  9/2016  ............ G06F 21/554

OTHER PUBLICATIONS https://assets.equifax.com/marketing/US/assets/account_opening_wp.pdf; Equifax, "Back to the Future: The Resurgence of New-Account Fraud", 2015, 8 pages, entire document (Year: 2015).*
(Continued)

*Primary Examiner* — Lynda Jasmin
*Assistant Examiner* — Kimberly L Evans
(74) *Attorney, Agent, or Firm* — Kilpatrick Townsend & Stockton LLP

(57) ABSTRACT

In some aspects, a computing system can detect synthetic identities based on attributes associated with online entities. The computing system can generate entity links between primary entity objects and a secondary entity object. The secondary entity object identifies a target consumer as a secondary entity for accounts identified by the primary entity objects. Attributes of the secondary entity object and attributes of the primary entity objects can be calculated and compared to determine an inconsistency between a combination of a name attribute value and an address attribute value of the secondary entity object as compared to the primary entity objects. A fraud warning indicating that the target consumer is likely to be a synthetic identity can be generated based on the inconsistency and other attributes of the target consumer, such as an inquiries attribute, a terminations attribute, a duration attribute, and so on.

17 Claims, 7 Drawing Sheets

(51) Int. Cl.
*H04W 12/122* (2021.01)
*G06Q 30/018* (2023.01)

(56) References Cited

U.S. PATENT DOCUMENTS

| | | | | |
|---|---|---|---|---|
| 2010/0268696 A1* | 10/2010 | Nightengale | ..... | G06F 16/24573 707/694 |
| 2014/0108251 A1* | 4/2014 | Anderson | .......... | G06Q 20/4016 705/44 |
| 2014/0283094 A1* | 9/2014 | Coggeshall | ............. | G06F 21/50 726/26 |
| 2015/0106270 A1* | 4/2015 | Burrell | ............... | G06Q 30/0631 705/44 |
| 2016/0057146 A1* | 2/2016 | Little | ...................... | G06F 21/31 726/6 |
| 2016/0071017 A1* | 3/2016 | Adjaoute | ............... | G06N 20/00 706/52 |
| 2016/0086262 A1* | 3/2016 | Straub | ................... | G06Q 50/265 705/38 |
| 2016/0321336 A1* | 11/2016 | Aharoni | ................... | G06F 16/26 706/52 |
| 2017/0061446 A1* | 3/2017 | Shaw | ................. | G06Q 30/0185 705/318 |
| 2017/0186009 A1* | 6/2017 | Zolli | .................. | G06Q 20/4016 705/39 |
| 2019/0122149 A1* | 4/2019 | Caldera | ................. | H04L 63/102 705/7 |
| 2020/0403992 A1* | 12/2020 | Huffman | ................ | H04W 12/30 |

OTHER PUBLICATIONS

Equifax, "Back to the Future: The Resurgence of New-Account Fraud", 2015, 8 pages.

* cited by examiner

SYNTHETIC ONLINE ENTITY DETECTION

CROSS REFERENCE TO RELATED APPLICATIONS

This application claims priority to U.S. Provisional Application No. 62/591,346, entitled "Detecting Synthetic Online Entities Based on Relationships to Primary Entities," filed on Nov. 28, 2017, which is hereby incorporated in its entirety by this reference.

TECHNICAL FIELD

This disclosure relates generally to computers and digital data processing systems for increasing a system's protection of data from compromised or unauthorized disclosure, and more particularly to increasing cybersecurity by detecting synthetic online entities, such as (but not limited to) false entities established with online services for fraudulent purposes.

BACKGROUND

Electronic transactions involve exchanges of products and services among different parties. For example, one entity may provide business credit, investment services, banking services, product supplies, manufacturing services, or any other type of product or service to one or more other entities.

Individuals engaging in fraud or other unauthorized online activity may create deep, fake entities. For example, a synthetic identity may be generated by creating fake documentation such as fake birth certificates, fake Social Security numbers, etc. Therefore, the synthetic identity may be associated with mortgages, credit cards, or other financial transactions.

A synthetic identity can pose risks that are absent from other types of fraudulent activity. For example, outside the realm of electronic transactions, the same individual cannot simultaneously pose as a first individual applying for a loan and a second individual co-signing on a loan without drawing suspicion. But a first synthetic identity and a second synthetic identity can perform the same transaction without appearing suspicious to the automated computing system that services the loan application. Thus, individuals that have created synthetic entities can use the relative anonymity provided by the Internet (e.g., the use of the synthetic identity to prevent linking the individual to online actions) to fraudulently apply for mortgages or credit cards, to conduct clandestine activities, or to engage in other illicit or otherwise unauthorized activities.

SUMMARY

Various embodiments of the present disclosure provide systems and methods for detecting synthetic identity fraud based on attributes associated with online entities. In one example, a fraud detection computing system can include a contributor external-facing device, which can obtain transaction data and account data for online entities through communications with contributor computing systems over a public data network. A secured part of the fraud detection computing system can include an identity repository and a fraud detection server system. The identity repository can securely store the account data and the transaction data obtained from the contributor computing systems. The fraud detection server system can generate, based on the account data and the transaction data, entity links between primary entity objects and a secondary entity object in a data structure. The primary entity objects identify primary entities for multiple accounts and the secondary entity object identifies the target consumer as a secondary entity for the accounts. The entity links include persistent associations in the data structure between the primary entity objects and the secondary entity object such that the relationship between the primary entity objects and the secondary entity object is represented in response to at least one of the primary entity objects and the secondary entity object being accessed.

The fraud detection computing system can also include a client external-facing device configured for receiving, from a client computing system, a query regarding the presence of a fraud warning for a target consumer associated with a consumer computing system. The fraud detection server system can service this query. For example, the fraud detection server system can correlate values between attributes of the secondary entity object and attributes of the primary entity objects. Based on the correlation, the fraud detection server system can detect an inconsistency between a combination of a name attribute value and an address attribute value of the secondary entity object as compared to the primary entity objects. The name attribute identifies a family name for an entity and the address attribute identifies a physical address for the entity. The fraud detection server system generates a fraud warning based on the inconsistency in the name attribute and the address attribute. The fraud detection server system can respond to the query by transmitting the fraud warning.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
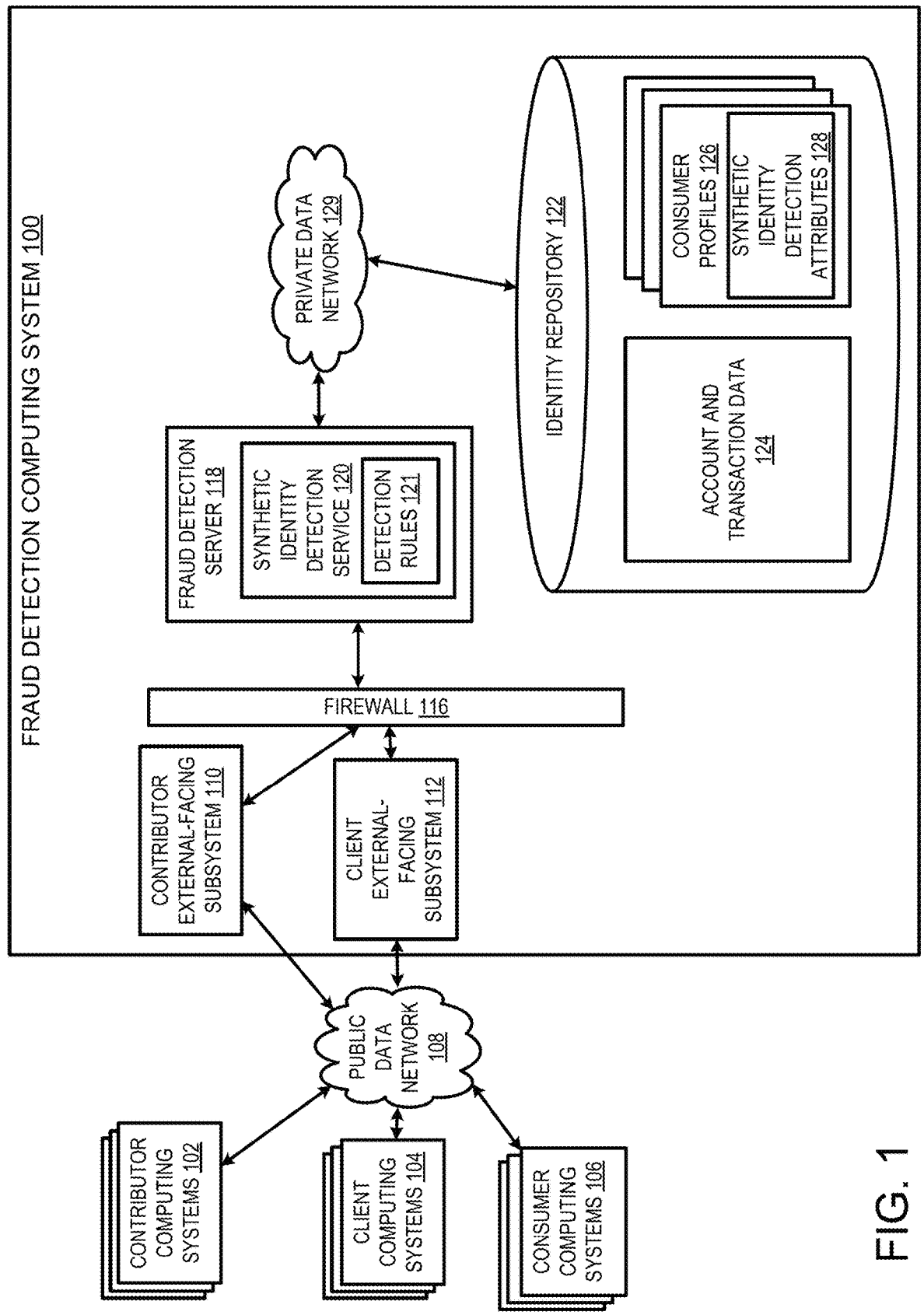
FIG. 1 is a block diagram depicting an example of an operating environment in which a fraud detection service handles queries regarding potential synthetic online identities according to certain aspects of the present disclosure.

Certain aspects and features of the present disclosure involve detecting indicators of synthetic identities by applying synthetic identity detection attributes including (but not limited to) attributes indicating relationships between potential synthetic identities and primary identities whose accounts have been used for fraud facilitation. For example, a fraud detection computing system, which can be used to help identify entities involved in fraud or fraud facilitation, can analyze relationships among online entities and, in some cases, their electronic transactions. For instance, the fraud detection computing system can analyze a particular online identity, which can be synthetic, that has been added as a secondary entity to an account for a primary entity, which can be an authentic identity. The fraud detection computing system can determine that certain expected relationships between these entities (e.g., the similarity of physical addresses, the similarity of family names, etc.) are not present. Based on this determination, the fraud detection computing system can provide, in real time, fraud warnings to client computing systems that are involved in online transactions with potential synthetic identities.

In some aspects, the fraud detection computing systems described herein can detect synthetic identities more effectively than existing computing systems. A synthetic identity can be an online identity that is created for fraudulent purposes or other illicit purposes. The synthetic identity lacks a complete match to a real person or other entity across all of its personally identifiable information ("PII") or other identification information. Existing systems for detecting synthetic identities can be less effective if, for example, the synthetic identities are linked to certain fraud facilitators, such as credit mules. An example of a credit mule is an individual or other entity whose online identity has extensive indicators of authenticity and who allows other individual or entities, such as entities associated with synthetic identities, to use those indicators of authenticity to maintain or support the synthetic identities. For example, a primary entity may have a long credit history and a high credit score, which is indicative of the primary entity being a real person rather than being a synthetic identity. This primary entity may be considered a verified entity, since the extensive indicators of authenticity allow the entity's online identity to be verified as authentic rather than synthetic. The primary entity can allow secondary entities (sometimes known as "credit renters") to be added to one or more of the primary entity's accounts, such as credit card accounts. A secondary entity's synthetic identity may appear to be authentic due to the secondary entity's presence on the verified entity's account. For example, most financial institutions allow the addition of authorized users on a primary account with little or no verification. Thus, the presence of the secondary entities on the verified entity's account can indicate that the secondary entities are also authentic, even if they are actually synthetic.

Certain aspects of the fraud detection systems described herein can address these deficiencies by detecting deviations from expected electronic relationships among primary and secondary entities (e.g., unexpected inconsistencies between primary and secondary entity objects having persistent electronic links), where these deviations are used to identify the synthetic identity. For example, a fraud detection system can analyze historical account and transaction activity for a primary entity and secondary entity. The fraud detection system can build links between primary entity data objects and secondary entity data objects to identify relationships between the primary and secondary entities. The entity links include persistent associations in a data structure between the primary entity objects and the secondary entity object. The persistent associations allow the relationship between the primary entity objects and the secondary entity object to be represented in response to at least one of the objects being accessed. The fraud detection system can identify potential synthetic identities from these links if, for example, the primary and secondary entities lack expected data relationships, such as shared physical address attributes, family name attributes, or both. Thus, unlike existing systems that are ineffective at detecting synthetic identities linked to fraud-facilitating accounts, fraud detection systems and techniques described herein can use links between fraud-facilitating accounts and synthetic identities to detect the synthetic identities. Aspects described herein thereby prevent fraudulent use of online services with the synthetic identities more effectively than existing systems.

The fraud detection system can further analyze an electronic history of the secondary entity for other indicators of synthetic identities (e.g., a small number of addresses associated with the secondary entity, an unusually large number of attempts to establish accounts with different types of online services over a short time period, a number of terminated secondary-entity accounts, etc.). The fraud detection system can thereby determine, in real-time during an electronic transaction between a third-party online service and a target consumer, that the target consumer may be a synthetic identity. For example, the fraud detection system can "flag" credit applicants in real-time based on these indicators.

Alternatively, or additionally, in some aspects, the fraud detection system can also identify potential synthetic identities based on attributes associated with the entities without explicitly exploring the relationships between the primary and secondary entities, such as the property data, employment data, inquiry patterns of the entities, and so on. For example, a machine learning model can be employed to explore the relationship between the various attributes of consumers and their respective likelihood of being a synthetic identity in previous transactions. The machine learning model can be utilized to generate detection rules for detecting synthetic identities for future transactions.

In some aspects, the fraud detection system can provide a single point-of-interface for different clients' systems that provide online services having sensitive data (e.g., online financial services, across different business entities within a banking system as a whole, etc.). The fraud detection system's role as a common point-of-interface to a fraud detection service facilitates real-time identification of potentially synthetic identities. For instance, the fraud detection system can securely aggregate account and transaction data from multiple contributor systems, generate accurate indicators of synthetic identity fraud, and provide fraud warnings to client computing systems. Providing this secure point-of-interface facilitates regular updates to the account and transaction data from multiple contributor systems and can provide access to accurate fraud warnings that are generated using data from multiple consumer and accounts identified in the data from the contributor systems.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Synthetic Identity Detection Service

Referring now to the drawings, FIG. 1 is a block diagram depicting an example of an operating environment in which a fraud detection service handles queries regarding potential synthetic online identities. FIG. 1 depicts examples of hardware components of a fraud detection computing system 100, according to some aspects. The fraud detection computing system 100 is a specialized computing system that may be used for processing large amounts of data using a large number of computer processing cycles.

The numbers of devices depicted in FIG. 1 are provided for illustrative purposes. Different numbers of devices may be used. For example, while certain devices or systems are shown as single devices in FIG. 1, multiple devices may instead be used to implement these devices or systems.

The fraud detection computing system 100 can communicate with various other computing systems, such as contributor computing systems 102 and client computing systems 104. For example, contributor computing systems 102 and client computing systems 104 may send data to the fraud detection server 118 to be processed or may send signals to the fraud detection server 118 that control or otherwise influence different aspects of the fraud detection computing system 100 or the data it is processing. The client computing systems 104 may also interact with consumer computing systems 106 via one or more public data networks 108 to facilitate electronic transactions between users of the consumer computing systems 106 and online services provided by the client computing systems 104. For instance, an individual can use a consumer computing system 106, such as a laptop or other end-user device, to access an online service hosted by a client computing system 104. An electronic transaction between the consumer computing system 106 and the client computing system 104 can include, for example, the consumer computing system 106 being used to submit an online credit card application or other digital application to the client computing system 104 via the online service.

The contributor computing systems 102 and client computing systems 104 may interact, via one or more public data networks 108, with various external-facing subsystems of the fraud detection computing system 100. The fraud detection computing system 100 can also include a contributor external-facing subsystem 110 and a client external-facing subsystem 112. Each external-facing subsystem includes one or more computing devices that provide a physical or logical subnetwork (sometimes referred to as a "demilitarized zone" or a "perimeter network") that expose certain online functions of the fraud detection computing system 100 to an untrusted network, such as the Internet or another public data network 108. In some aspects, these external-facing subsystems can be implemented as edge nodes, which provide an interface between the public data network 108 and a cluster computing system, such as a Hadoop cluster used by the fraud detection computing system 100.

Each external-facing subsystem is communicatively coupled, via a firewall device 116, to one or more computing devices forming a private data network 129. The firewall device 116, which can include one or more devices, creates a secured part of the fraud detection computing system 100 that includes various devices in communication via the private data network 129. In some aspects, by using the private data network 129, the fraud detection computing system 100 can house the identity repository 122 in an isolated network (i.e., the private data network 129) that has no direct accessibility via the Internet or another public data network 108.

Each contributor computing system 102 may include one or more third-party devices (e.g., computing devices or groups of computing devices), such as individual servers or groups of servers operating in a distributed manner. A contributor computing system 102 can include any computing device or group of computing devices operated by an online merchant, an e-commerce system, an employer, a payroll system, a human-resource management system, an insurance provider system, a healthcare provider system, a government data-provider system, etc. The contributor computing system 102 can include one or more server devices. The one or more server devices can include or can otherwise access one or more non-transitory computer-readable media. The contributor computing system 102 can also execute an online service. The online service can include executable instructions stored in one or more non-transitory computer-readable media. The contributor computing system 102 can further include one or more processing devices that are capable of storing, formatting, and transmitting income data, employment data, or both to a fraud detection computing system 100.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute an online service. The online service can include executable instructions stored in one or more non-transitory computer-readable media. The client computing system 104 can further include one or more processing devices that are capable of executing the online service to perform operations described herein.

In some aspects, the online service can provide an interactive computing environment accessible to consumer computing systems 106 to facilitate electronic transactions involving a user of a consumer computing system 106. Examples of the interactive computing environment include a mobile application specific to a particular client computing system 104, a web-based application accessible via mobile device, etc. In some aspects, the executable instructions for the interactive computing environment can include instructions that provide one or more graphical interfaces. The graphical interfaces are used by a consumer computing system 106 to access various functions of the interactive computing environment. For instance, the interactive computing environment may transmit data to and receive data from a consumer computing system 106 to shift between different states of interactive computing environment, where the different states allow one or more electronics transactions between the consumer computing system 106 and the client computing system 104 to be performed. The online service may transmit data to and receive data from the consumer computing system 106 to enable a transaction.

A consumer computing system 106 can include any computing device or other communication device operated by a consumer, a buyer, or other user. The consumer computing system 106 can include one or more consumer computing systems 106. A consumer computing system 106 can include executable instructions stored in one or more non-transitory computer-readable media. The consumer computing system 106 can also include one or more processing devices that are capable of executing the consumer computing system 106 to perform operations described herein. In some aspects, the consumer computing system 106 can allow a user to engage in mobile commerce with a client computing system 104.

For instance, the user or other entity accessing the consumer computing system 106 can use the consumer computing system 106 to engage in an electronic transaction with a client computing system 104 via an interactive computing environment provided by an online service. An electronic transaction between the consumer computing system 106 and the client computing system 104 can include, for example, the consumer computing system 106 being used to query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by a financial institution can include electronic functions for obtaining one or more financial services, such as loan application and management tools, credit card application and transaction management workflows, electronic fund transfers, etc., via. A consumer computing system 106 can be used to request access to the interactive computing environment provided by the client computing system 104. Based on the request, the client computing system 104 can collect data associated with the customer and communicate with the fraud detection server 118 for synthetic identity detection. Based on the synthetic identity results generated by the fraud detection server 118, the client computing system 104 can determine whether to grant, delay or deny the electronic transaction involving the consumer computing system 106 thereby granting or denying the access request of the consumer computing system 106 to certain features of the interactive computing environment.

Each communication within the fraud detection computing system 100 may occur over one or more data networks, such as a public data network 108, a private data network 129, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to fraud detection computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The fraud detection computing system 100 can include one or more fraud detection servers 118. The fraud detection server 118 may be a specialized computer or other machine that processes the data received within the fraud detection computing system 100. The fraud detection server 118 may include one or more other systems. For example, the fraud detection server 118 may include a database system for accessing the network-attached storage unit, a communications grid, or both. A communications grid may be a grid-based computing system for processing large amounts of data.

In some aspects, the fraud detection server 118 can use data obtained from contributor computing systems 102 to facilitate the real-time provision of fraud-related information, such as indicators that a target consumer is a synthetic identity, to client computing systems 104 that engage in electronic transactions with consumer computing systems 106. This provision of information facilitates real-time detection of potential fraudulent activity in electronic transactions. This real-time detection can occur during an electronic transaction between the client computing system 104 and a consumer computing system 106. The fraud detection computing system 100 can communicate with the client computing systems 104 in a manner that is out of band with respect to the contributor computing systems 102, the consumer computing systems 106, or both. For example, the communications between the fraud detection computing system 100 and a contributor computing system 102 can be performed via a separate communication channel, session, or both as compared to the communication channel or session established between the fraud detection computing system 100 and a client computing system 104.

The fraud detection server 118 can include one or more processing devices that execute program code, such as a synthetic identity detection service 120. The program code is stored on a non-transitory computer-readable medium.

The synthetic identity detection service 120 can execute one or more processes for applying rule-based data analytics that identify a potential synthetic identity being used in a target transaction. An illustrative example of such a target transaction is an electronic request for a new credit card application in which communications with an applicant occur solely through electronic data networks (i.e., a communication medium required for successful use of synthetic identities). The synthetic identity detection service 120 retrieves an electronic history, such as a credit file in a consumer profile 126 for the target consumer, using query parameters in a query received from the client computing system 104. Examples of these query parameters include one or more of a target consumer's name, date of birth, social security number, address, phone number, etc. The synthetic identity detection service 120 computes attributes values for a set of the synthetic identity detection attributes

128. The synthetic identity detection service 120 applies one or more detection rules 121 to the computed attribute values. If the applied detection rules 121 result in an output indicating that the target consumer is likely using a synthetic identity, such as an output value of "True," the synthetic identity detection service 120 generates a fraud warning.

In some aspects, the synthetic identity detection service 120 can include one or more modules, such as a web server module, a web services module, or an enterprise services module, which individually or in combination facilitate electronic transactions. For example, a web server module can be executed by a suitable processing device to provide one or more web pages or other interfaces to a contributor computing system 102, a client computing system 104, or a consumer computing system 106. The web pages or other interfaces can include content provided by the web services module. The web services module can generate this content by executing one or more algorithms using information retrieved from one or more of the account and transaction data 124. The enterprise services module can be executed to retrieve the information from one or more of the account and transaction data 124.

The fraud detection computing system 100 may also include one or more network-attached storage units on which various repositories, databases, or other data structures are stored. Examples of these data structures are the identity repository 122. Network-attached storage units may store a variety of different types of data organized in a variety of different ways and from a variety of different sources. For example, the network-attached storage unit may include storage other than the primary storage located within fraud detection server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The identity repository 122 can store account and transaction data 124, consumer profiles 126, or both. The account and transaction data 124 can be analyzed by the synthetic identity detection service 120 to identify, for example, secondary entity accounts that belong to synthetic identities. The account and transaction data 124 can be received by the fraud detection server 118 from contributor computing systems 102, generated by the fraud detection server 118 based on communications with contributor computing systems 102, or some combination thereof. The account and transaction data 124 can be stored in, for example, a database or other suitable data source. Suitable data sources can include, for example, secure and credentialed databases or other data structures managed by or otherwise accessible by the synthetic identity detection service 120.

The account and transaction data 124 can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The identity repository 122 can store any type of account data, transaction data, or both. The identity repository 122 can include internal databases or other data sources that are stored at or otherwise accessible via the private data network 129. Non-limiting examples of data stored in identity repository 122 include tradeline data, employment data such as the work number ("TWN") data on employment status of consumers, income data, tax data, asset data (e.g., property records or verified data regarding other assets possessed by a client), data from service providers (e.g., cable television companies, telecommunications operators, and utility providers) such as national consumer telecom & utilities exchange ("NCTUE") data that include prior delinquency or charge-off on telecommunications and utilities, inquiry data of a consumer inquiring industries and products provided by various financial institutions, and other types of consumer information.

The consumer profiles 126 can include data regarding respective clients. The data included in the consumer profiles 126 can be received from one or more contributor computing systems 102. In some aspects, data from multiple accounts in the identity repository 122 can be linked to or otherwise associated with a given consumer profile 126 using a referential keying system.

In some aspects, the fraud detection computing system 100 can implement one or more procedures to secure communications between the fraud detection computing system 100 and other client systems. Non-limiting examples of features provided to protect data and transmissions between the fraud detection computing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Examples of Fraud Detection Operations

The fraud detection computing system 100 can execute one or more processes that transmit, in real-time, fraud warnings or other indicators of synthetic fraud risks to client computing systems 104. For instance, client computing systems 104 may be operated by financial institutions that engage in online transactions with remote consumer computing system 106. Synthetic identities may be used to gain unauthorized or illicit access to sensitive data or online services provided by the client computing systems 104. For example, an interactive computing environment provided by an online service, which is hosted by a client computing system 104, can be accessed by a consumer computing system 106, where communications from the consumer computing system 106 appear to originate from a synthetic identity (e.g., a user who uses one or more aspects of the synthetic identity to hide the user's true identity).

A conventional client computing system is vulnerable to this type of unauthorized system use via synthetic identities because the conventional client computing system lacks the interfaces to the various contributors systems that provide data usable for detecting a synthetic identity and lacks access to the type of identity repository described herein that organizes the contributor data in a manner that facilitates synthetic identity detection. The disclosure provided herein improves upon the ability of a client computing system to prevent unauthorized intrusions into the online service, the interactive computing environment associated therewith, or any other online system associated with the client computing system by providing access to an external system that is better positioned to perform the synthetic identity detection.

For instance, the improvement involves providing a fraud detection computing system 100 that is external to the client computing system, in the sense that the fraud detection server can have interfaces to contributor computing system 103 and access to the identity repository 122. In addition, the fraud detection computing system 100 also involves a synthetic identity detection process that occurs external to the communication session between the client computing system and the consumer computing system. This further increases the security and accuracy of the synthetic identity detection because the synthetic identity detection is performed without either the consumer computing device or the client device being able to access the data or processes used in the synthetic identity detection. Based on the synthetic identity detection, the fraud detection computing system 100 can create fraud warnings that are applied to certain consumer profiles 126 appearing to be synthetic identities. The fraud warning can be utilized to delay or deny the transactions involving the consumers identified as synthetic identities, and/or to control access to the interactive computing environments of the client computing system by these consumers.

Figure 2:
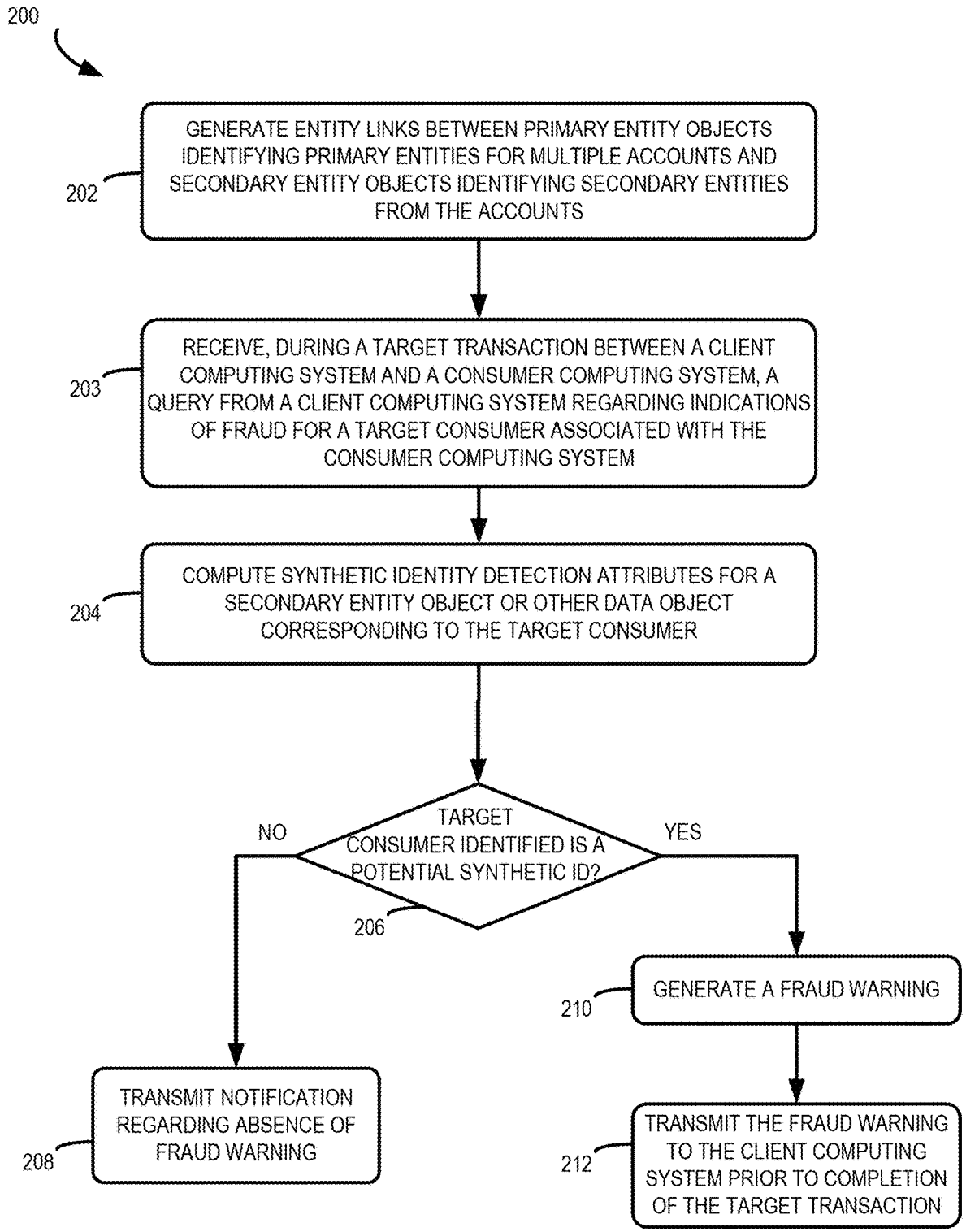
FIG. 2 is a flow chart illustrating an example of a process for updating and using an identity repository data structure for detecting synthetic identities according to certain aspects of the present disclosure.

FIG. 2 is a flow chart illustrating an example of a process 200 for updating and using an identity repository data structure for detecting synthetic identities. For illustrative purposes, the process 200 is described with reference to implementations described above with respect to one or more examples described herein. Other implementations, however, are possible. In some aspects, the steps in FIG. 2 may be implemented in program code that is executed by one or more computing devices such as the fraud detection server 118 depicted in FIG. 1. In some aspects of the present disclosure, one or more operations shown in FIG. 2 may be omitted or performed in a different order. Similarly, additional operations not shown in FIG. 2 may be performed.

At block 202, the process 200 involves generating entity links between primary entity objects identifying primary entities for multiple accounts and secondary entity objects identifying secondary entities for the accounts. The fraud detection server 118 can execute the synthetic identity detection service 120 and thereby perform one or more operations for generating links between primary entity objects and secondary entity objects. For example, the synthetic identity detection service 120 can access, from a non-transitory computer-readable medium, account data and transaction data 124. The synthetic identity detection service 120 can identify primary entities (e.g., primary cardholders) from the account data and transaction data 124. The synthetic identity detection service 120 can group different sets of account data and transaction data 124, such as tradelines for different credit accounts, into primary entity data objects, such as a consumer profile 126 having a "primary" identifier. The synthetic identity detection service 120 can also group different sets of account data and transaction data 124, such as tradelines for different credit accounts, into secondary entity data objects that identify secondary entities (e.g., authorized users added to a credit account). The synthetic identity detection service 120 can link the primary entity object to a given secondary entity object based, for example, on the tradeline data identifying both the primary entity and the secondary entity as users on an account, parties to an electronic transaction, etc. The entity links include persistent associations in the identity repository 122 between the primary entity objects and the secondary entity object. The persistent associations allow the relationship between the primary entity objects and the secondary entity object to be represented in response to at least one of the objects being accessed.

The synthetic identity detection service 120 can communicate with one or more contributor computing systems 102 to obtain the account or transaction data 124. In some aspects, a contributor external-facing subsystem 110 can communicate with a contributor computing system 102 via a public data network 108, such as the Internet. The contributor external-facing subsystem 110 can establish a secure communication channel, such as an SFTP connection, over the public data network 108 and with the contributor computing system 102. In some aspects, the secure communication channel can be automatically established on a periodic basis (e.g., each week, each bi-week, etc.). In additional or alternative aspects, the secure communication channel can be established by one or more of the computing systems in response to a command received via a user interface. The contributor external-facing subsystem 110 can receive the account or transaction data 124 via the secure communication channel. The contributor external-facing subsystem 110 can transmit the account or transaction data 124 to the fraud detection server 118 via the firewall device 116.

At block 203, the process 200 involves receiving, during a target transaction between a client computing system 104 and a consumer computing system 106, a query from a client computing system 104 regarding indications of fraud for a target consumer associated with the consumer computing system 106. The fraud detection server 118 can execute the synthetic identity detection service 120 and thereby perform one or more operations for communicating with a client computing system 104 to receive a query. The query can include any suitable query parameters for identifying one or more consumer entities. Examples of query parameters include PII data and a request to check for indications of synthetic-identity-based fraud. In some aspects, multiple queries can be bundled into a batch request. For example, hundreds or thousands of queries may be included in a batch request from client computing system 104 that services a large client entity (e.g., large lenders, etc.). The process 200, including the operations described below, can be automatically applied to service the hundreds or thousands of queries in the batch request.

In some aspects, the client external-facing subsystem 112 can communicate with a client computing system 104 via a public data network 108, such as the Internet. The client external-facing subsystem 112 can establish a secure communication channel (e.g., an SFTP connection, an HTTP connection, etc.) over the public data network 108 and with the client computing system 104. In some aspects, the secure communication channel can be automatically established on a periodic basis (e.g., each week, each bi-week, etc.). In additional or alternative aspects, the secure communication channel can be established by one or more of the computing systems in response to a command received via a web interface that is provided from the fraud detection computing system 100 (e.g., using the client external-facing subsystem 112) to the client computing system 104. The client external-facing subsystem 112 can receive one or more queries via the secure communication channel. The client external-facing subsystem 112 can transmit the query to the fraud detection server 118 via the firewall device 116.

At block 204, the process 200 involves computing, based at least partially on the entity links, various synthetic identity detection attributes 128 for a given secondary entity object or other data object corresponding to the target consumer. The fraud detection server 118 can execute the synthetic identity detection service 120 and thereby perform one or more operations for computing the synthetic identity detection attributes 128. The synthetic identity detection service 120 can use the synthetic identity detection attributes 128 to identify potentially synthetic identities from data about a target consumer received during a target transaction, such as a request for a new credit line.

One example of a synthetic identity detection attribute 128 is a duration attribute. The duration attribute can identify an amount of time (e.g., a number of days) between the creation of a credit file for the target consumer and the target transaction. In some aspects, the duration attribute provides quantified information regarding the credit history of the target consumer.

Another example of a synthetic identity detection attribute 128 is an address attribute. The address attribute can identify a number of addresses reported in the credit file for the target consumer. The address attribute can assist with detection of synthetic identities because, for example, a synthetic identity is more likely to have a shorter address history (i.e., fewer different historical addresses) in a credit file as compared to an authentic identity.

Another example of a synthetic identity detection attribute 128 is an inquiries attribute. The inquiries attribute can identify a number of industries the target consumer has inquired for a specified time period (e.g., 90 days) prior to the target transaction. The inquiries attribute can be used to identify suspicious inquiry patterns. For example, the inquiries attribute can have a value showing that the target consumer is associated with credit inquiries across a larger number of different industries over a shorter time period (e.g., inquiries or applications for different financial products). In this manner, the inquiries attribute indicates that the target consumer has been attempting to rapidly acquire electronic access to a large number of products (e.g., credit cards, loans, etc.). This activity can be an indicator of a synthetic identity.

Another example of a synthetic identity detection attribute 128 is a terminations attribute. The terminations attribute can identify a number of terminated trades associated with the target consumer. The terminations attribute can indicate that the target consumer has, for example, established an "authorized user" tradeline in order to inherit the good credit history of a primary user.

Another example of a synthetic identity detection attribute 128 is an address-matching attribute. The address-matching attribute can identify whether the target consumer is identified as an authorized user for a tradeline belonging to a primary user and whether the target consumer has the same address as the primary user. The address-matching attribute can allow the synthetic identity detection service 120 to identify cases in which an individual has been added to a tradeline as an authorized user without being located at the same physical address as the primary user. These cases indicate that the target consumer has tried to expand an electronic history for a synthetic identity (e.g., by increasing a credit score) by inheriting a good credit history from a primary user. By contrast, the address-matching attribute for an authentic identity is more likely to show that an authorized user (i.e., a target consumer having the authentic identity) has the same physical address as the primary user.

Another example of a synthetic identity detection attribute 128 is a name-matching attribute. The name-matching attribute can identify whether the last name of an authorized user on a tradeline is the same as a primary user on a tradeline. The name-matching attribute can identify a case in which a fraudster using a synthetic identity is added as an authorized user to a tradeline, but has a last name or other family name different from the primary user. These cases indicate that the target consumer has tried to expand an electronic history for a synthetic identity (e.g., by increasing a credit score) by inheriting a good credit history from a primary user. By contrast, the name-matching attribute for an authentic identity is more likely to show that an authorized user (i.e., a target consumer having the authentic identity) has the same last name or other family name as the primary user.

At block 206, the process 200 involves determining, from a combination of the synthetic identity detection attributes 128, whether a target consumer identified in a fraud-warning query is a potential synthetic identity. For example, the synthetic identity detection service 120 can access one or more detection rules 121 from a non-transitory computer-readable medium. The synthetic identity detection service 120 can correlate values within the secondary entity object to the primary entity objects and identifies an inconsistent value for the same type of value (e.g., a combination of name attribute value and address attribute value) between the secondary entity object and the primary entity objects.

The synthetic identity detection service 120 can apply one or more decision rules to tradeline data for a target consumer and thereby generate a predictive output indicating whether a target consumer is using a synthetic identity. In some aspects, the synthetic identity detection service 120 can determine whether a secondary entity object (i.e., a target consumer) has different values for a name attribute, an address attribute, or both as compared to the primary entity objects. The presence of these different attribute values can indicate that the target consumer is a synthetic identity.

In additional or alternative aspects, the synthetic identity detection service 120 can determine whether an inquiries attribute computed for a target consumer identifies a number of categories of online services having inquires for the target consumer over an evaluation period that is greater than a threshold number of categories. For instance, if a consumer profile 126 for a target consumer includes tradeline inquiries with respect to many different types of industries, the inquiries attribute can indicate that the number of categories of inquiries is larger than a threshold number of categories of inquiries. The presence of this excessive number of different categories of inquiries can indicate that the target consumer is a synthetic identity.

In additional or alternative aspects, the synthetic identity detection service 120 can determine whether a terminations attribute computed for a target consumer identifies a number of categories of online services having inquires for the target consumer over an evaluation period that is greater than a threshold number of categories. For instance, a consumer profile 126 for a target consumer can include a number of tradeline terminations (e.g., accounts in which a secondary entity status of the target consumer has been terminated) that is greater than a threshold number of terminations. The presence of this excessive number of different terminations can indicate that the target consumer is a synthetic identity.

In additional or alternative aspects, the synthetic identity detection service 120 can use other synthetic identity detection attributes. In one example, the synthetic identity detection service 120 can determine whether a duration attribute, which indicates that a duration since an electronic history for the target consumer was created, is less than a threshold duration. In another example, the synthetic identity detection service 120 can determine whether an address attribute, which indicates that a number of physical address in the electronic history for the target consumer, is less than a threshold number of physical addresses.

Figure 3:
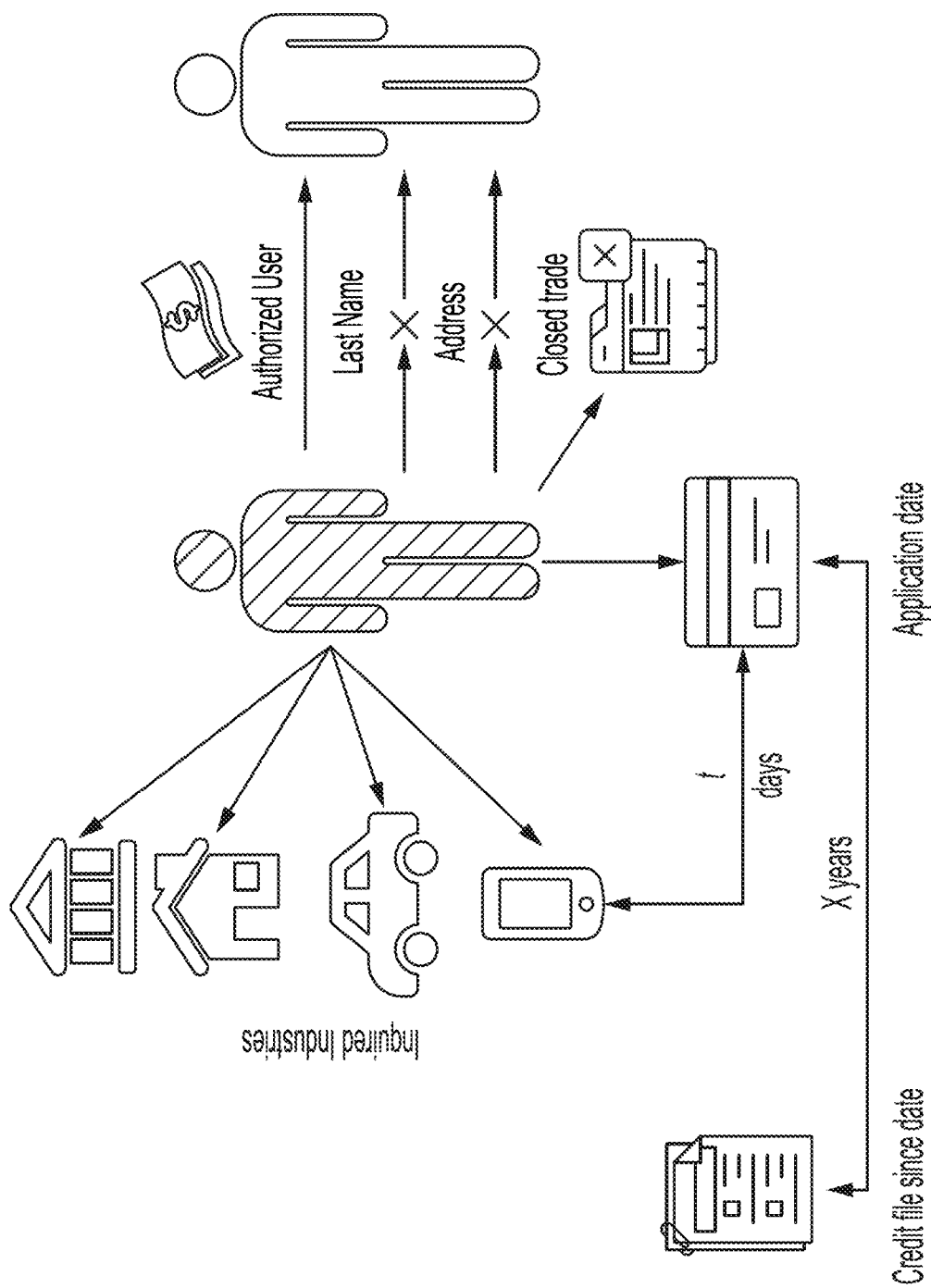
FIG. 3 depicts an example of a decision rule combining the different synthetic identity detection attributes according to certain aspects of the present disclosure.

FIG. 3 depicts an example of a decision rule combining the different synthetic identity detection attributes. The decision rule depicted in FIG. 3 includes the following logic.

(i) "application date is within x years of the credit file creation date" AND ("the target consumer's address is different from the primary user" OR "the target consumer has inquired at least y different industries for the t days prior to the application date" OR "the target consumer has terminated trade(s)"))

OR (ii) "only z addresses exist in the credit file for the target consumer" AND "both the address and last name of the target consumer are different from the primary user" AND "the target consumer has inquired at least k different industries for the t days prior to the application date"

Returning to FIG. 2, if the target consumer is not identified as a potentially synthetic identity, the process involves transmitting, to the client computing system 104, a notification indicating that no fraud warning has been identified with respect to the target consumer, as depicted at block 208. If the target consumer is identified as a potentially synthetic identity, the process involves generating a fraud warning, as depicted at block 210. The fraud warning message can include any suitable data indicating that the target consumer may be a synthetic identity. An example of this data includes a recommendation to perform additional verification of the target consumer's identity. At block 212, the process 200 involves transmitting the fraud warning to the client computing system 104 prior to completion of the target transaction. The fraud warning can be used by the client computing system 104 for one or more operations with respect to the target consumer. In one example, the fraud warning or the absence thereof can be utilized to grant, delay or deny the target transaction involving the target consumer. In another example, the fraud warning can be utilized to control access to one or more interactive computing environments by the target consumer.

Figure 4:
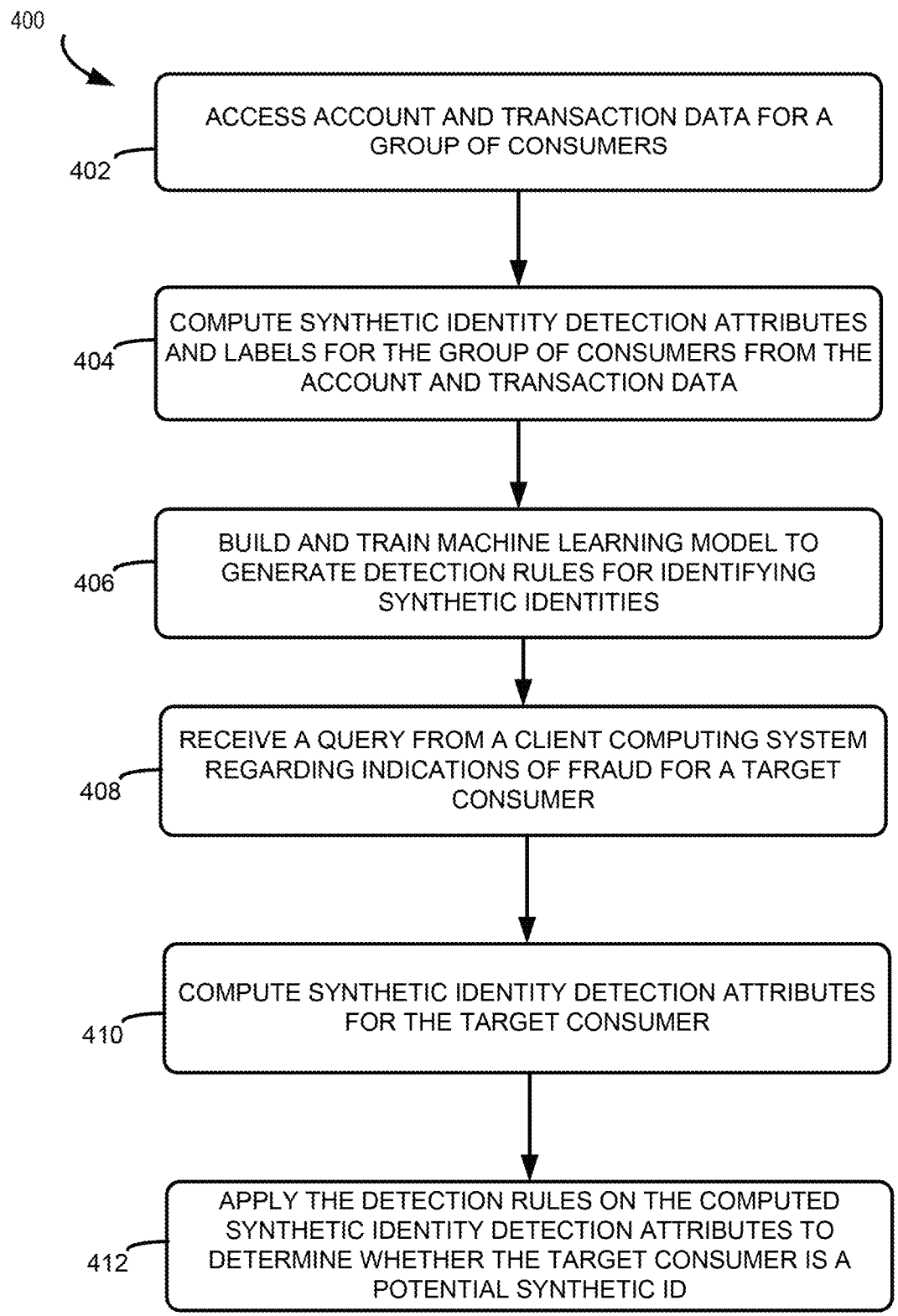
FIG. 4 is a flow chart depicting an example of a process for generating detection rules using a machine learning model and using the detection rules to detect synthetic identities according to certain aspects of the present disclosure.

According to some aspects described herein, synthetic identities can be detected without explicitly exploring the relationship between the secondary entities and the primary entities. For example, a machine learning model can be established and trained to capture the relationship between various attributes of consumers and the likelihood of a respective consumer to be a synthetic identity. FIG. 4 shows a flow chart depicting an example of a process 400 for generating detection rules 121 using a machine learning model and using the detection rules 121 to detect synthetic identities.

For illustrative purposes, the process 400 is described with reference to implementations described above with respect to one or more examples described herein. Other implementations, however, are possible. In some aspects, the steps in FIG. 4 may be implemented in program code that is executed by one or more computing devices such as the fraud detection server 118 depicted in FIG. 1. In some aspects of the present disclosure, one or more operations shown in FIG. 4 may be omitted or performed in a different order. Similarly, additional operations not shown in FIG. 4 may be performed.

At block 402, the process 400 involves accessing various data associated with a group of consumers. For example, the fraud detection server 118 (or other suitable server) can build and train a machine-learning model from account and transaction data 124, such as service provider data, inquiry data, property data, demographic data, and the employment data. The group of consumers include consumers that are determined to be associated with authentic identities and consumers that are determined to be associated with synthetic identities.

At block 404, the process 400 involves computing synthetic identity detection attributes 128 for the group of consumers based on the data accessed in block 402, such as the account and transaction data 124. The fraud detection server 118 can compute synthetic identity detection attributes 128 by extracting relevant information from a single category of data in the account and transaction data 124. For example, the synthetic identity detection attributes 128 can include employment attributes indicating the employment status of a consumer and the length of the employment. The fraud detection server 118 can extract these employment attributes from the employment data of the account and transaction data 124, such as the TWN data. If a consumer is currently employed and has been employed for a long period of time, the identity associated with the consumer is more likely to be an authentic identity; otherwise, the identity is more likely to be a synthetic identity. Likewise, the synthetic identity detection attributes 128 can include attributes extracted from service provider data, such as the NCTUE data based on a prior delinquency of the consumer on telecommunication or utility bills.

The fraud detection server 118 can also compute the synthetic identity detection attributes 128 by joining two or more categories of data in the account and transaction data 124. For example, the synthetic identity detection attributes 128 can include property attributes indicating whether a consumer owns a real property. The identity associated with a consumer who owns a real property is more likely to be an authentic identity. Whether a consumer owns a property can be determined by joining the property data with the demographic data to determine whether demographic data match the property data. If a match is found, such as the name and address of the demographic data and the property data for a consumer match, the fraud detection server 118 can determine that the consumer owns the particular property; otherwise, the property attributes can indicate that the consumer does not own the property. In some aspects, the synthetic identity detection attributes 128 can also include any of the attributes described above with respect to block 204, such as the inquiries attributes that identify a number of industries each of the group of consumers have inquired for a specified time period prior to a transaction.

In addition to computing the synthetic identity detection attributes 128, block 404 of process 400 also involves identifying labels for the group of consumers indicating the likelihood of the respective consumers being a synthetic identity. The fraud detection server 118 can obtain the labels directly from the client computing systems 104 which determine the labels based on historical transactions. Alternatively, or additionally, the fraud detection server 118 can derive the labels based on the data obtained from the contributor computing systems 102, the client computing systems 104 or any other data sources. For example, losses suffered by a bank due to a consumer defaulting on a credit card can be utilized to infer whether the identity associated with this particular consumer is synthetic or not. A large number of losses that occurred within a short period of time from opening the credit card can indicate a high likelihood of the identity being synthetic. Similarly, credit losses associated with a consumer can also be utilized to derive the likelihood of the identity of the consumer being synthetic.

At block 406, the process 400 involves building and training one or more machine learning models to generate detection rules 121 for identifying synthetic identities. In some aspects described herein, the machine learning models can include random forests that operate by constructing multiple decision trees at training time and outputting the likelihood of an identity being synthetic based on the multiple decision trees. These multiple decision trees reflect the multiple detection rules 121 that can be utilized to detect synthetic identities. Additional details regarding the generation of the detection rules based on machine learning models will be provided below with regard to FIG. 5.

At block 408, the process 400 involves receiving, during a target transaction between a client computing system 104 and a consumer computing system 106, a query from a client computing system 104 regarding indications of fraud for a target consumer associated with the consumer computing system 106. The query can be received in a way similar to that described above in block 203 of process 200.

At block 410, the process 400 involves computing synthetic identity detection attributes 128 for the target consumer. The fraud detection server 118 can compute the synthetic identity detection attributes 128 in the same way as that described above in block 404 of the process 400. To reduce the consumption of computational resources, as such CPU time and memory space, in some implementations, the fraud detection server 118 computes, in block 410, a subset of the synthetic identity detection attributes 128 computed in block 404. The fraud detection server 118 can determine this subset of attributes based on the detection rules 121 generated at block 406 by selecting attributes that are involved in the detection rules 121.

At block 412, the process 400 involves applying the detection rules 121 generated in block 408 on the synthetic identity detection attributes 128 calculated in block 410 to determine whether the target consumer is a potentially synthetic identity. Similar to blocks 206-212 described above with regard to FIG. 2, if the target consumer is not identified as a synthetic identity, the fraud detection server 118 can transmit to the client computing system 104 a notification that no fraud warning has been identified with respect to the target consumer. Otherwise, the fraud detection server 118 can generate a fraud warning and transmit the fraud warning to the client computing system 104 prior to completion of the target transaction so that the client computing device can grant, delay or deny the target transaction involving the target consumer based on the fraud warning.

According to some aspects described herein, the fraud detection server 118 (or other suitable server) can organize the account and transaction data 124 in terms of the categories of the underlying transactions, such as credit card transactions, automobile loan transactions or home loan transactions. The fraud detection server 118 can perform process 400 for each category of the account and transaction data 124. For instance, the fraud detection server 118 can determine the synthetic identity detection attributes 128 and labels in block 404 based on the account and transaction data 124 in the automobile loan category. The fraud detection server 118 can utilize the detection rules 121 generated in block 406 based on such attributes and labels to identify synthetic identities in automobile loan transactions. Similarly, the fraud detection server 118 can determine synthetic identity detection attributes 128 and the labels based on transactions data in the credit card category and utilize the detection rules 121 generated based on such attributes and labels to identify synthetic identities in credit card transactions.

In addition, the fraud detection server 118 can perform the synthetic identity detection involved in blocks 408-412 of the process 400 each time a query is received regarding a target consumer, whereas the fraud detection server 118 can perform the detection rule generation involved in blocks 402-406 less frequently. For example, the fraud detection server 118 can perform the detection rule generation if the fraud detection server 118 determines that the account and transaction data 124 have been updated and the detection rules 121 should be updated accordingly.

Figure 5:
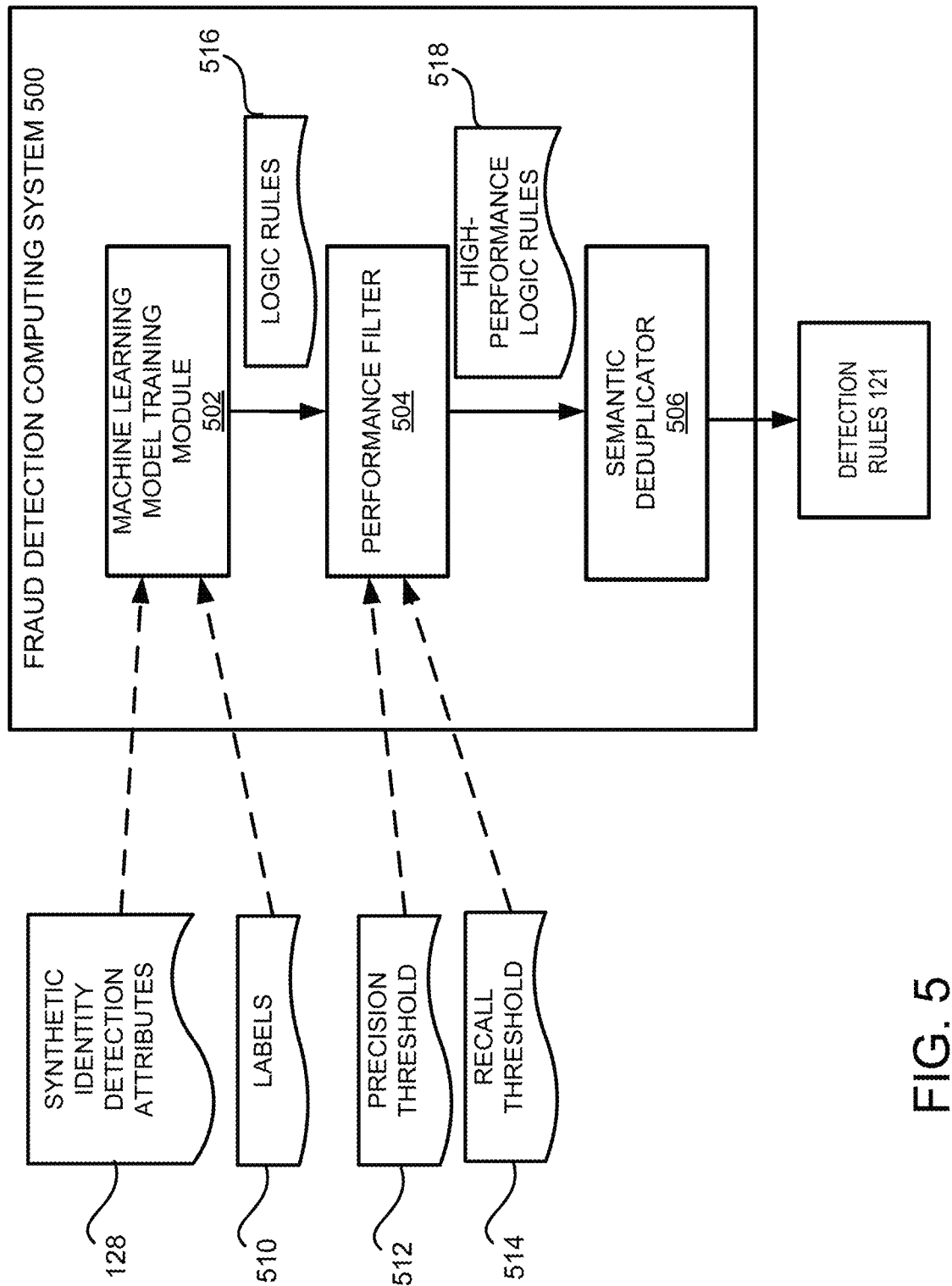
FIG. 5 is a block diagram depicting an example of a detection rule generator for generating synthetic identity detection rules based on a machine learning model according to certain aspects of the present disclosure.

FIG. 5 illustrates a block diagram depicting an example of a detection rule generator 500 for generating synthetic identity detection rules 121 based on a machine learning model. The detection rule generator 500 can be implemented by the fraud detection server 118 or, more specifically, by the synthetic identity detection service 120 shown in FIG. 1. As shown in FIG. 5, the detection rule generator 500 includes a machine learning model training module 502 that builds and trains a machine learning model for detecting synthetic identities. As discussed above, the machine learning model can include random forests including multiple decision trees, representing the decision rules identified by the machine learning model. The fraud detection server 118 can perform the training of the machine learning model based on the synthetic identity detection attributes 128 and the corresponding labels 510 indicating the likelihood of an identity being synthetic calculated as discussed above with respect to FIG. 4.

The outputs of the training of the machine learning models can include a set of logic rules 516, for example, represented by the multiple decision trees of the machine learning model. These logic rules 516, however, may not satisfy performance criteria, such as precision and recall rates, required by the synthetic identity detection. The fraud detection server 118 can impose these or other performance criteria to ensure the performance of the synthetic identity detection because, for certain transactions, the outcome of the synthetic identity detection has a significant impact on a target consumer and the bank or other entities involved in the transaction. For instance, if an authentic target consumer in a home loan application transaction is erroneously determined to be synthetic, the target consumer may be denied the loan application thereby losing the opportunity to purchase his or her house. On the other hand, if a synthetic identity is determined to be authentic, the bank offering the loan would suffer losses on the target consumer which can be significant if the number of this type of misidentification is large. As such, the detection rule generator 500 can include a performance filter 504 to filter the logic rules 516 generated by the machine learning model to select high-performance logic rules 518. In some aspects, the fraud detection server 118 can perform the filtering based on a precision threshold 512 and a recall threshold 514. Those logic rules that generate detection results with a precision rate higher than the precision threshold 512 and a recall rate higher than the recall threshold 514 can be selected as high-performance logic rules 518.

The detection rule generator 500 can further include a semantic deduplicator 506 to adjust the high-performance logic rules 518 to remove any duplication in the rules and to eliminate any rules that are unreasonable if examined on an individual consumer level. The output of the semantic deduplicator 506 can be utilized as the detection rules 121 for detecting synthetic identities as discussed above with regard to FIG. 4.

Figure 6:
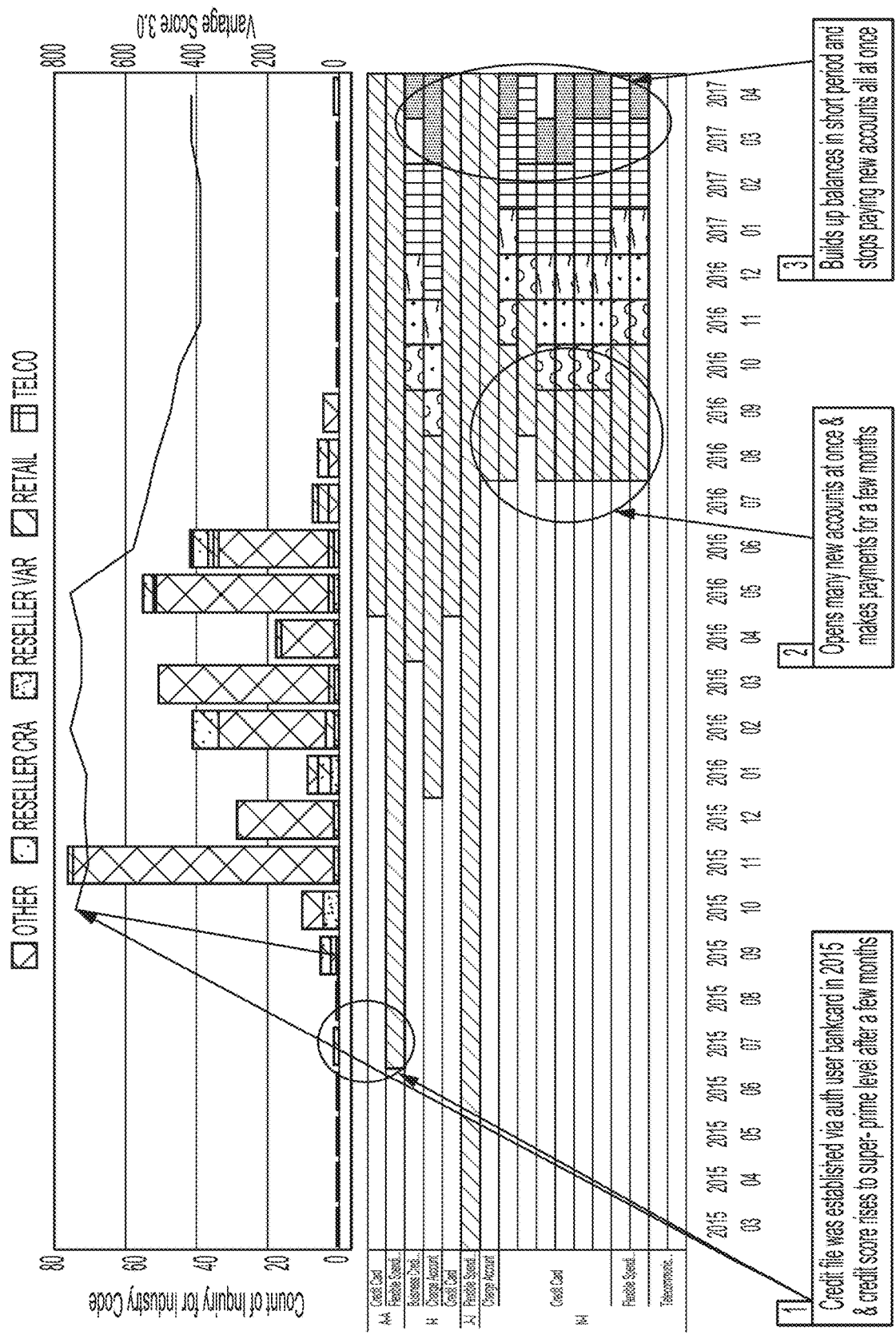
FIG. 6 depicts an example of activity associated with a synthetic identity that can be detected using the synthetic identity detection service according to certain aspects of the present disclosure.

FIG. 6 depicts an example of activity associated with a synthetic identity that can be detected using the synthetic identity detection service. In this example, a synthetic identity is used to establish an account in July 2015. In the following months, a user of the synthetic identity increases a credit score associated with the synthetic identity by, for example, becoming an authorized user or other secondary entity on an account held by an authentic identity having a good credit score. The increased credit score associated with the synthetic identity is used to open accounts across multiple types of industries in August 2016. The user of the synthetic identity accumulates balances on the various accounts and then ceases payment on the accounts. Thus, the synthetic identity has been used to execute fraudulent online activities.

The synthetic identity detection service 120 described herein can identify this activity as being indicative of a synthetic identity. For instance, discrepancies between primary and secondary name attributes and address attributes can be detected by the synthetic identity detection service 120 and used to warn of potential fraud in August 2016, when various accounts with client services are being established. Furthermore, the short amount of time between the July 2015 establishment of a credit file (or another electronic history) of the synthetic identity and the August 2016 applications for various accounts can be used to identify potentially fraudulent activity at an application stage. Thus, the synthetic identity detection attributes 128 can be used to intervene before the fraudulent online activities (e.g., the unpaid balances in later 2017) occur.

Example of Computing Environment for Synthetic Identity Detection Service

Figure 7:
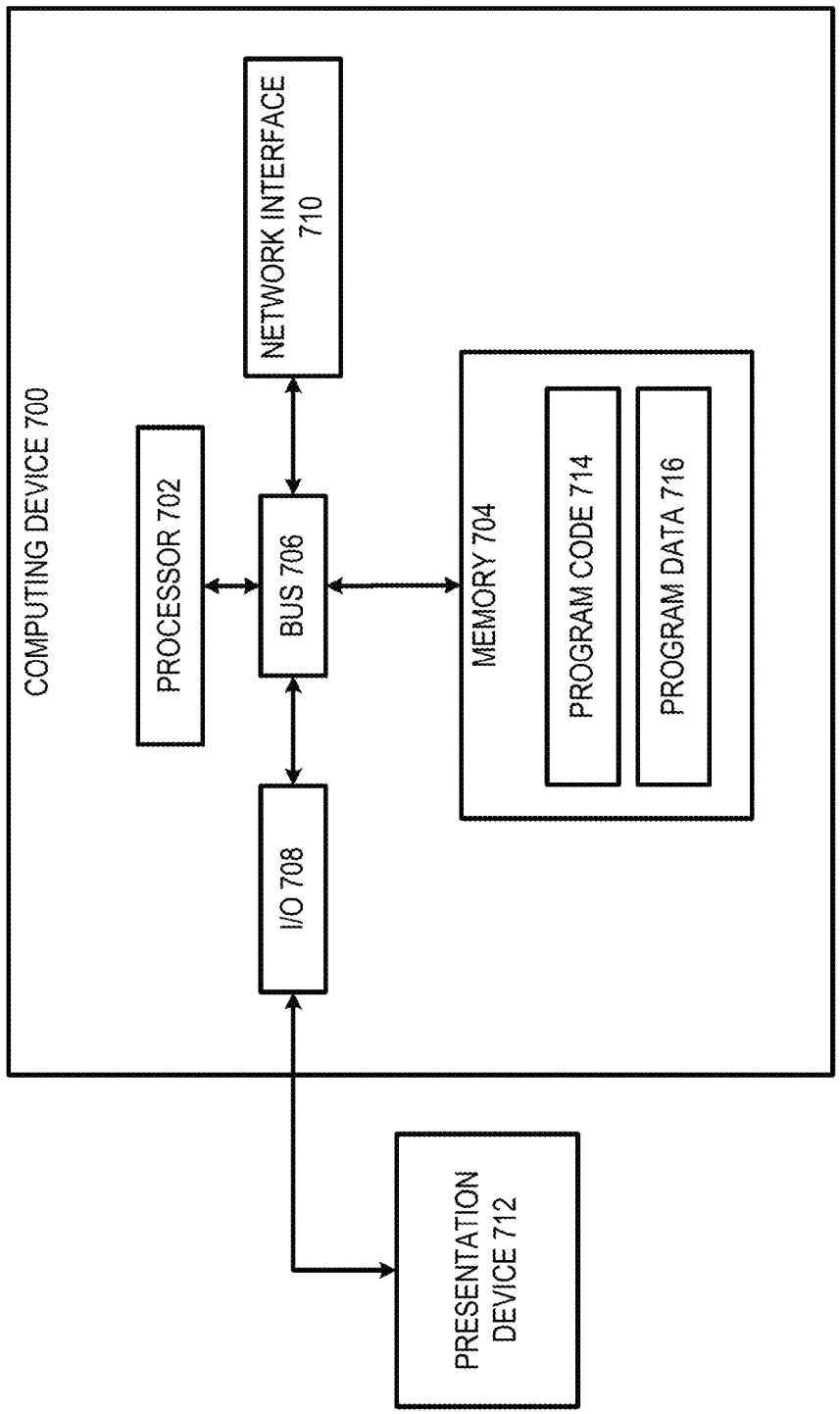
FIG. 7 is a block diagram depicting an example of a computing system suitable for implementing aspects of the techniques and technologies presented herein.

Any suitable computing system or group of computing systems can be used to perform the operations for detecting synthetic identities described herein. For example, FIG. 7 is a block diagram depicting an example of a fraud detection server 118. The example of the fraud detection server 118 can include various devices for communicating with other devices in the fraud detection computing system 100, as described with respect to FIG. 1. The fraud detection server 118 can include various devices for performing one or more transformation operations described above with respect to FIGS. 1-6.

The fraud detection server 118 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The fraud detection server 118 may also include a number of external or internal devices such as input or output devices. For example, the fraud detection server 118 is shown with an input/output interface 708 that can receive input from input devices or provide output to output devices. A bus 706 can also be included in the fraud detection server 118. The bus 706 can communicatively couple one or more components of the fraud detection server 118.

The fraud detection server 118 can execute program code that includes the synthetic identity detection service 120. The program code for the synthetic identity detection service 120 may be resident in any suitable computer-readable medium and may be executed on any suitable processing device. For example, as depicted in FIG. 7, the program code for the synthetic identity detection service 120 can reside in the memory 704 at the fraud detection server 118. Executing the synthetic identity detection service 120 can configure the processor 702 to perform the operations described herein.

In some aspects, the fraud detection server 118 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the fraud detection server 118 using one or more data networks described herein. In other aspects, the presentation device 712 can be omitted.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A fraud detection computing system comprising:
a contributor external-facing device configured for:
communicating with a fraud detection server system through a security portal and for obtaining, via communications with contributor computing systems over a public data network, transaction data and account data for online entities;
a client external-facing device configured for:
receiving, from a client computing system and during a target transaction between the client computing system and a consumer computing system, a query regarding a presence of a fraud warning for a target consumer associated with the consumer computing system; and
transmitting, prior to completion of the target transaction, the fraud warning to the client computing system;
an identity repository to securely store the account data and the transaction data obtained from the contributor computing systems; and
the fraud detection server system configured for:
identifying, based, at least in part, upon the account data and the transaction data, a plurality of primary entities that are verified authentic entities;
identifying, based, at least in part, upon the account data and the transaction data, a plurality of secondary entities that are added to a plurality of accounts of the plurality of primary entities;
generating, in a data structure, entity links between primary entity objects identifying the plurality of primary entities that are verified authentic entities and secondary entity objects identifying respective secondary entities in the plurality of secondary entities that are added to the plurality of accounts of the plurality of primary entities; the entity links including persistent associations in the data structure representing a relationship of the secondary entity objects being secondary to the respective primary entity objects such that the relationship is represented in response to at least one of the primary entity objects and the associated secondary entity objects being accessed;
accessing attributes of a secondary entity object identifying the target consumer as a secondary entity in the plurality of secondary entities that is on an account of the plurality of accounts;
accessing attributes of a primary entity object that has an entity link with the secondary entity object, the primary entity object identifying a primary entity of the account from the plurality of primary entities;
comparing a first combination of a name attribute value and an address attribute value of the secondary entity object and a second combination of a name attribute value and an address attribute value of the primary entity object, a name attribute identifying a family name for an entity and an address attribute identifying a physical address for the entity;
generating, responsive to the query, the fraud warning based, at least in part, upon the first combination being different from the second combination according to the comparison;
computing synthetic identity detection attributes and labels for a group of consumers based on the account data and the transaction data; and
generating a plurality of decision rules for identifying synthetic identities by training a machine learning model based on the synthetic identity detection attributes and the labels for the group of consumers; wherein training the machine learning model generates a plurality of logic rules and wherein the plurality of decision rules are generated by further filtering the plurality of logic rules based, at least in part, upon a precision threshold and a recall threshold.

2. The fraud detection computing system of claim 1, wherein the fraud detection server system is further configured for:
   computing an inquiries attribute for the target consumer, where the inquiries attribute identifies a number of categories of online services having inquires for the target consumer over an evaluation period;
   determining that the number of categories in the inquiries attribute is greater than a threshold number of categories; and
   generating the fraud warning based on the inquiries attribute in addition to the first combination being different from the second combination.

3. The fraud detection computing system of claim 2, wherein the fraud detection server system is further configured for:
   computing a terminations attribute for the target consumer, where the terminations attribute identifies a number of accounts of the plurality of accounts in which a secondary entity status of the target consumer has been terminated;
   determining that the number of the accounts in the terminations attribute is greater than a threshold number of terminations; and
   generating the fraud warning based on the terminations attribute in addition to the inquiries attribute and the first combination being different from the second combination.

4. The fraud detection computing system of claim 2, wherein the fraud detection server system is further configured for generating the fraud warning based on one or more of:
   a duration attribute for the target consumer indicating that a duration since an electronic history for the target consumer was created is less than a threshold duration; and
   an attribute for the target consumer indicating that a number of physical addresses in the electronic history for the target consumer is less than a threshold number of physical addresses.

5. The fraud detection computing system of claim 1, wherein the fraud detection server system is further configured for:
   computing the synthetic identity detection attributes for the target consumer; and
   generating the fraud warning further based on the synthetic identity detection attributes for the target consumer satisfying a plurality of detection rules.

6. A method that includes one or more processing devices performing operations comprising:
   obtaining, by a contributor external-facing device of a fraud detection computing system via communications with contributor computing systems over a public data network, transaction data and account data for online entities;
   identifying, based, at least in part, upon the transaction data and the account data for online entities, a plurality of primary entities that are verified authentic entities;
   identifying, based, at least in part, upon the transaction data and the account data, a plurality of secondary entities that are added to a plurality of accounts of the plurality of primary entities;
   generating, in a data structure and by a fraud detection server system, entity links between primary entity objects identifying the plurality of primary entities and secondary entity objects identifying the respective secondary entities in the plurality of secondary entities that are added to the plurality of accounts of the plurality of primary entities;
   receiving, by a client external-facing device of the fraud detection computing system from a client computing system and during a target transaction between the client computing system and a consumer computing system, a query regarding a presence of a fraud warning for a target consumer associated with the consumer computing system;
   accessing, by the fraud detection server system, attributes of a secondary entity object identifying the target consumer as a secondary entity from the plurality of secondary entities that is on an account of the plurality of accounts;
   accessing attributes of a primary entity object that has an entity link with the secondary entity object, the primary entity object identifying a primary entity of the account from the plurality of primary entities;
   comparing a first combination of a name attribute value and an address attribute value of the secondary entity object for the target consumer and a second combination of a name attribute value and an address attribute value of the primary entity object;
   generating, by the fraud detection server system and responsive to the query, a fraud warning based, at least in part, upon the first combination being different from the second combination according to the comparison;
   transmitting, by the client external-facing device and prior to completion of the target transaction, the fraud warning to the client computing system;
   computing synthetic identity detection attributes and labels for a group of consumers based on the account data and the transaction data; and
   generating a plurality of decision rules for identifying synthetic identities by training a machine learning model based on the synthetic identity detection attributes and the labels for the group of consumers; wherein training the machine learning model generates a plurality of logic rules and wherein the plurality of decision rules are generated by further filtering the plurality of logic rules based, at least in part, upon a precision threshold and a recall threshold.

7. The method of claim 6, wherein the entity links between the primary entity objects and the secondary entity object include persistent associations in the data structure between the primary entity objects and the secondary entity object such that a relationship between the primary entity objects and the secondary entity object is represented in response to at least one of the primary entity objects and the secondary entity object being accessed.

8. The method of claim 6, further comprising:
   computing, by the fraud detection server system, an inquiries attribute for the target consumer, where the inquiries attribute identifies a number of categories of online services having inquires for the target consumer over an evaluation period;

determining that the number of categories in the inquiries attribute is greater than a threshold number of categories; and generating the fraud warning based on the inquiries attribute in addition to the first combination being different from the second combination.

9. The method of claim 8, further comprising:

computing a terminations attribute for the target consumer, where the terminations attribute identifies a number of accounts of the plurality of accounts in which a secondary entity status of the target consumer has been terminated;

determining that the number of the accounts in the terminations attribute is greater than a threshold number of terminations; and generating the fraud warning based on the terminations attribute in addition to the inquiries attribute and the first combination being different from the second combination.

10. The method of claim 8, wherein generating the fraud warning is further based on one or more of:

a duration attribute for the target consumer indicating that a duration since an electronic history for the target consumer was created is less than a threshold duration; and an attribute for the target consumer indicating that a number of physical addresses in the electronic history for the target consumer is less than a threshold number of physical addresses.

11. The method of claim 6, further comprising:

computing, by the fraud detection server system, the synthetic identity detection attributes for the target consumer; and generating the fraud warning further based on the synthetic identity detection attributes for the target consumer satisfying a plurality of detection rules.

12. A non-transitory computer-readable storage medium having program code that is executable by a processor device to cause a computing device to perform operations, the operations comprising:

obtaining transaction data and account data for online entities;

identifying, based, at least in part, upon the transaction data and the account data, a plurality of primary entities that are verified authentic entities;

identifying, based, at least in part, upon the transaction data and the account data, a plurality of secondary entities that are added to a plurality of accounts of the plurality of primary entities;

generating, in a data structure, entity links between primary entity objects identifying the plurality of primary entities and secondary entity objects identifying respective secondary entities in the plurality of secondary entities that are added to the plurality of accounts of the plurality of primary entities;

receiving from a client computing system and during a target transaction between the client computing system and a consumer computing system, a query regarding a presence of a fraud warning for a target consumer associated with the consumer computing system;

accessing attributes of a secondary entity object identifying the target consumer as a secondary entity from the plurality of secondary entities that is on an account of the plurality of accounts;

accessing attributes of a primary entity object that has an entity link with the secondary entity object, the primary entity object identifying a primary entity of the account from the plurality of primary entities;

comparing a first combination of a name attribute value and an address attribute value of the secondary entity object for the target consumer and a second combination of a name attribute value and an address attribute value of the primary entity object;

generating a fraud warning based, at least in part, upon the first combination being different from the second combination according to the comparison;

causing the fraud warning to be transmitted to the client computing system prior to completion of the target transaction;

computing synthetic identity detection attributes and labels for a group of consumers based on the account data and the transaction data; and generating a plurality of decision rules for identifying synthetic identities by training a machine learning model based on the synthetic identity detection attributes and the labels for the group of consumers; wherein training the machine learning model generates a plurality of logic rules and wherein the plurality of decision rules are generated by further filtering the plurality of logic rules based, at least in part, upon a precision threshold and a recall threshold.

13. The non-transitory computer-readable storage medium of claim 12, wherein the entity links between the primary entity objects and the secondary entity object include persistent associations in the data structure between the primary entity objects and the secondary entity object such that a relationship between the primary entity objects and the secondary entity object is represented in response to at least one of the primary entity objects and the secondary entity object being accessed.

14. The non-transitory computer-readable storage medium of claim 12, wherein the operations further comprise:

computing an inquiries attribute for the target consumer, where the inquiries attribute identifies a number of categories of online services having inquires for the target consumer over an evaluation period;

determining that the number of categories in the inquiries attribute is greater than a threshold number of categories; and generating the fraud warning based on the inquiries attribute in addition to the first combination being different from the second combination.

15. The non-transitory computer-readable storage medium of claim 14, wherein the operations further comprise:

computing a terminations attribute for the target consumer, where the terminations attribute identifies a number of accounts of the plurality of accounts in which a secondary entity status of the target consumer has been terminated;

determining that the number of the accounts in the terminations attribute is greater than a threshold number of terminations; and generating the fraud warning based on the terminations attribute in addition to the inquiries attribute and the first combination being different from the second combination.

16. The non-transitory computer-readable storage medium of claim 12, wherein generating the fraud warning is further based on one or more of:
   a duration attribute for the target consumer indicating that a duration since an electronic history for the target consumer was created is less than a threshold duration; and
   an attribute for the target consumer indicating that a number of physical addresses in the electronic history for the target consumer is less than a threshold number of physical addresses.

17. The non-transitory computer-readable storage medium of claim 12, wherein the operations further comprise:
   computing the synthetic identity detection attributes for the target consumer; and
   generating the fraud warning further based on the synthetic identity detection attributes for the target consumer satisfying a plurality of detection rules.

* * * * *